(12) United States Patent
Leinen

(10) Patent No.: US 10,247,316 B2
(45) Date of Patent: Apr. 2, 2019

(54) CONTROL CARTRIDGE HAVING HIGH VOLUMETRIC FLOW AND A VARIABLE MIXED WATER OUTLET

(71) Applicant: CERAMTEC GMBH, Plochingen (DE)

(72) Inventor: Josef Leinen, Wittlich (DE)

(73) Assignee: CERAMTEC GMBH, Plochingen (DE)

( * ) Notice: Subject to any disclaimer, the term of this patent is extended or adjusted under 35 U.S.C. 154(b) by 0 days.

(21) Appl. No.: 15/313,894

(22) PCT Filed: May 20, 2015

(86) PCT No.: PCT/EP2015/061104
§ 371 (c)(1),
(2) Date: Nov. 28, 2016

(87) PCT Pub. No.: WO2015/181020
PCT Pub. Date: Dec. 3, 2015

(65) Prior Publication Data
US 2017/0191576 A1    Jul. 6, 2017

(30) Foreign Application Priority Data

May 26, 2014  (DE) .......................... 10 2014 007 592

(51) Int. Cl.
*F16K 11/078* (2006.01)
*F16K 27/04* (2006.01)
*G05D 23/13* (2006.01)

(52) U.S. Cl.
CPC ........ *F16K 11/0782* (2013.01); *F16K 27/045* (2013.01); *G05D 23/1313* (2013.01); *Y10T 137/86549* (2015.04)

(58) Field of Classification Search
USPC .................................................... 137/625.17
See application file for complete search history.

(56) References Cited

U.S. PATENT DOCUMENTS 3,384,119 A * 5/1968 Manoogian ......... F16K 11/0787
                                                   137/625.17
3,747,638 A    7/1973 Manoogian et al.
(Continued)

FOREIGN PATENT DOCUMENTS

EP          0044901 A1    2/1982
EP          0571768 A2    12/1993

OTHER PUBLICATIONS

International Search Report for PCT/EP2015/061104 dated Aug. 12, 2015; English translation submitted herewith (7 Pages).
(Continued)

*Primary Examiner* — John Fox
(74) *Attorney, Agent, or Firm* — Fitch, Even, Tabin & Flannery, LLP

(57) ABSTRACT

The invention relates to a control cartridge for single-lever mixing taps, comprising a housing having a cylindrical housing wall and a base having a borehole for an inlet for cold water and a borehole for an inlet for hot water. Three ceramic disks are situated one above the other on the base, namely, a lower base disk having a borehole for the inlet for hot water and a borehole for the inlet for cold water, a rotatable and displaceable ceramic control disk which rests on the base disk and has a control edge on the circumferential surface, and an upper bearing disk which is sealed off from the housing or the housing wall. In order for mixed water to be dischargeable either laterally or vertically with the same installation space or the same installation height and installation diameter, it is proposed that the base and the base disk each have a mixed water outlet in addition to the two inlets for cold water and hot water. The inlets for hot water and for cold water and the mixed water outlet are situated one above the other in the base and in the base disk. The base is sealed off from the housing wall, and, depending on the requirements, the housing wall has an opening for a (Continued)

Figure 1:
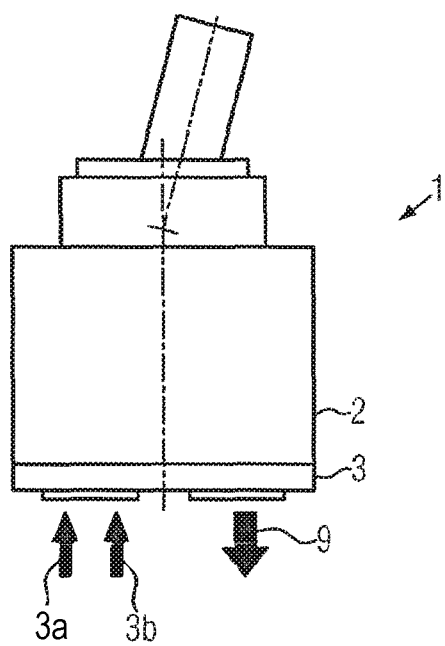

lateral mixed water outlet or no opening in the housing wall for a vertical mixed water outlet.

4 Claims, 9 Drawing Sheets

(56) References Cited

U.S. PATENT DOCUMENTS

| | | | | |
|---|---|---|---|---|
| 4,378,029 | A | * | 3/1983 | Parkison ............ F16K 11/0787 137/625.4 |
| 4,617,965 | A | * | 10/1986 | Lorch ................ F16K 11/0782 137/625.17 |
| 4,676,270 | A | * | 6/1987 | Knapp ................ F16K 11/0782 137/270 |
| 4,733,688 | A | | 3/1988 | Lorch |
| 4,738,281 | A | * | 4/1988 | Limet ................ F16K 11/0782 137/625.17 |
| 5,095,934 | A | * | 3/1992 | Iqbal ................... F16K 11/0782 137/270 |
| 5,755,261 | A | | 5/1998 | Fukuzawa et al. |
| 7,134,452 | B2 | * | 11/2006 | Hiroshi ............... F16K 11/0787 137/625.41 |
| 8,578,966 | B2 | * | 11/2013 | Thomas ............. F16K 11/0787 137/625.17 |
| 2014/0034857 | A1 | | 2/2014 | Chen |

OTHER PUBLICATIONS

Search Report of CN Appln. No. 201580027149.1 dated May 14, 2018 with English translation.

* cited by examiner

PRIOR ART

CONTROL CARTRIDGE HAVING HIGH VOLUMETRIC FLOW AND A VARIABLE MIXED WATER OUTLET

CROSS-REFERENCE TO RELATED APPLICATIONS

This application is a U.S. national phase application filed under 35 U.S.C. § 371 of International Application No. PCT/EP2015/061104, filed May 20, 2015, designating the United States, which claims priority from German Patent Application No. 10 2014 007 592.3, filed May 26, 2014, which are hereby incorporated herein by reference in their entirety for all purposes.

The invention describes a control cartridge for single-lever mixer taps, comprising a housing having a cylindrical housing wall and a base having a borehole for an inlet for cold water and a borehole for an inlet for hot water, three ceramic disks being situated one above the other on the base, namely, a lower base disk having a borehole for the inlet for hot water and a borehole for the inlet for cold water, a rotatable and displaceable ceramic control disk which rests on the base disk and has a control edge on the circumferential surface, and an upper bearing disk which is sealed off from the housing or the housing wall.

In conventional single-lever mixer taps, valves having ceramic sealing disks are almost exclusively used; in the sanitary fitting sector, these valves are referred to as cartridges or control cartridges. These cartridges are almost always characterized in that two ceramic sealing disks, a base disk and a control disk are contained in a housing. In some special applications, cartridges having three sealing disks are also used.

Conventional cartridges are designed in such a way that the inlets for the cold water and hot water lead vertically downwardly into the cartridge. The mixed water likewise exits vertically from the cartridge in the opposite direction (see FIG. 1). This is achieved by diverting the water in the control disk by 180°. If a lateral water discharge is required, the cartridge base is elevated so that the water may exit laterally via the elevated base (see FIG. 2).

Figure 3:
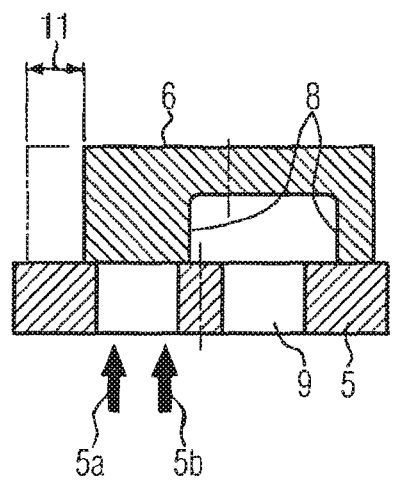

The sealing with respect to the fitting body is then achieved via a seal on the periphery of the base, such as an O-ring. This necessarily requires more vertical installation space. In both systems, however, the water is always diverted in the control disk by 180°. The lift of the control disk significantly influences the opening cross sections of the base disk, and thus the maximum volumetric flow of the valve. The higher the lift, the greater the volumetric flow. The lift is significantly limited due to the fact that the control disk must divert the water, and therefore has a cup-shaped design. This situation is shown in FIG. 3 for a closed cartridge and in FIG. 4 for an open cartridge.

To avoid this problem, so-called "open cartridges" having a housing which is open at the side (see FIG. 5) are sometimes used. However, these systems do not allow an exclusively downward discharge of mixed water, since the housing is open and would thus necessarily result in leaks. A closed housing would also result in leaks, since the base is not sealed off from the housing.

FIG. 1 shows a known control cartridge 1, comprising a housing having a housing wall 2 and a flat base 3. Two sealing disks made of ceramic, a base disk, and a control disk are situated in the housing. The base disk has a mixed water outlet 9 in addition to the inlet for hot water 3b and the inlet for cold water 3a. The mixed water leaves the base disk, and thus the control cartridge 1, vertically.

Figure 2:
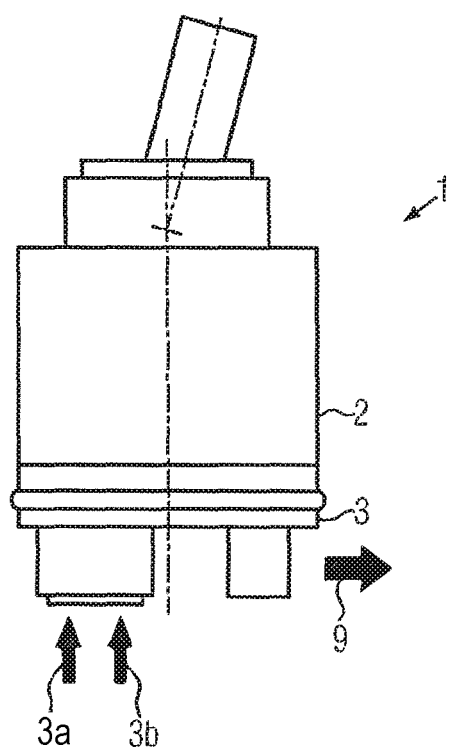

FIG. 2 shows a known control cartridge 1 having a lateral mixed water outlet. Here, the cartridge has a so-called high base; i.e., the installation height is significantly greater. Here as well, the mixed water leaves the base disk vertically and is diverted laterally by the high base.

Figure 4:
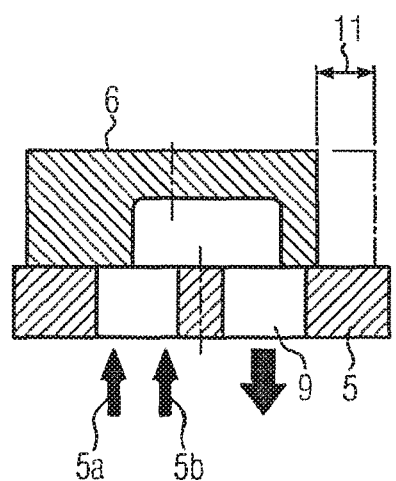

In these known control cartridges 1, the control edges 8 are situated on an inner surface of the control disk 6. It may also be stated that the control disk 6 is closed or has a cup-shaped design. This is shown in FIGS. 3 and 4. FIG. 3 shows the position of the control disk 6 in which the control cartridge 1 is closed. FIG. 4 shows the position of the control disk 6 in which the control cartridge 1 is open.

Due to this closed control disk 6 with the control edge 8 on the inner surface, only a small cross section is available for the cold and hot inlets 5a, 5b and for the mixed water outlet 9, since the lift 11 is greatly limited. The control disk 6 must cover the boreholes of the base disk 5 in all positions in order to ensure leak-tightness (FIGS. 3 and 4). Thus, the maximum volumetric flow of the cartridge is also greatly limited.

To increase the maximum volumetric flow, a generic specialized control cartridge 1 having three ceramic disks 5, 6, 7, a lower base disk 5, a middle control disk 6, and an upper bearing disk 7 is known. These three disks 5, 6, 7 are installed in a housing which has a mixed water outlet on its circumferential surface or its housing wall 2. This outlet is also referred to as a lateral outlet 12. The installation space in which the disks 5, 6, 7 are situated is open toward the housing and toward the base 3, i.e., is not sealed off (see FIGS. 5 and 6).

The base disk 5 has only two boreholes, namely, an inlet 5a for cold water and an inlet 5b for hot water. A mixed water outlet is not present in the base disk 5 (see FIG. 6).

The boreholes are opened and closed by displacing and rotating the control disk as is customary, so that the temperature of the mixed water and the volumetric flow may be adjusted. An important feature of this known control disk 6 is the location of the control edge 8. The control edge is situated on the circumferential surface of the control disk 6 and not on an inner surface of the control disk, as is the case for standard cartridges. If the control edge 8 rests on the circumferential surface, this has the advantage that with the same installation space, more lift may be achieved and the mixed water outlet may be designed to be much larger. This specialized control cartridge therefore has a higher volumetric flow which is considerably greater than that for the standard cartridges from FIGS. 1 and 2. However, this specialized control cartridge is not suitable for a lateral outlet, since the base is not sealed off from the housing (see FIG. 6).

The object of the invention is to improve the specialized control cartridge described above with the high volumetric flow in such a way that the mixed water may be discharged either laterally or vertically with the same installation space or the same installation height and installation diameter. The specification for the same installation space is important.

This object is achieved according to the invention by a control cartridge for single-lever mixing taps including a housing having a cylindrical housing wall and a base having a borehole for an inlet for cold water and a borehole for an inlet for hot water, three ceramic disks being situated one above the other on the base, namely, a lower base disk having a borehole for the inlet for hot water and a borehole for the inlet for cold water, a rotatable and displaceable ceramic control disk which rests on the base disk and has a control edge on the circumferential surface, and an upper bearing disk which is sealed off from the housing or the housing wall. The base and the base disk each have a mixed water outlet in addition to the two inlets for cold water and hot water, the inlets for hot water and for cold water and the mixed water outlet being situated one above the other in the base and in the base disk, and the base being sealed off from the housing wall. Depending on the requirements, the housing wall has an opening for a lateral mixed water outlet or no opening in the housing wall for a vertical mixed water outlet.

Figure 5:
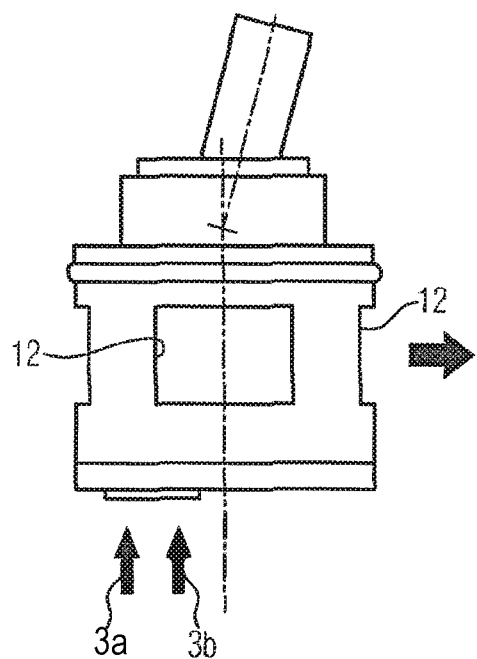
Figure 6:
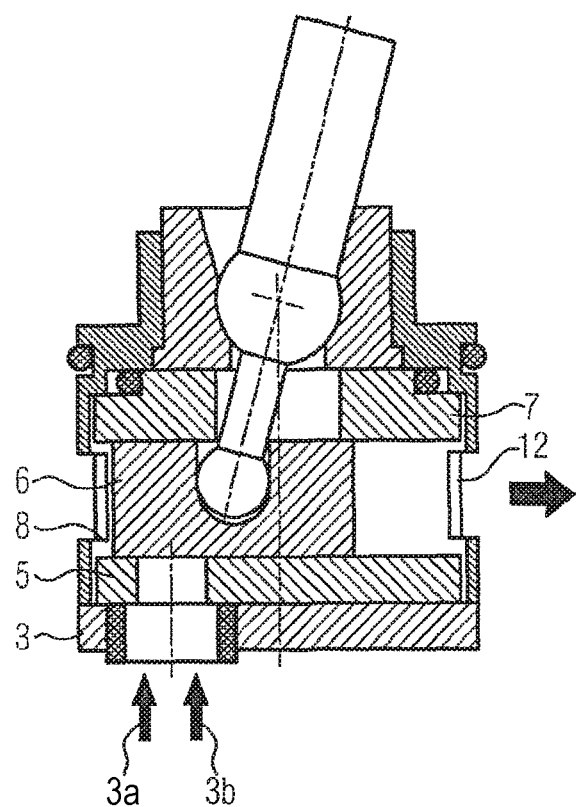
Figure 7:
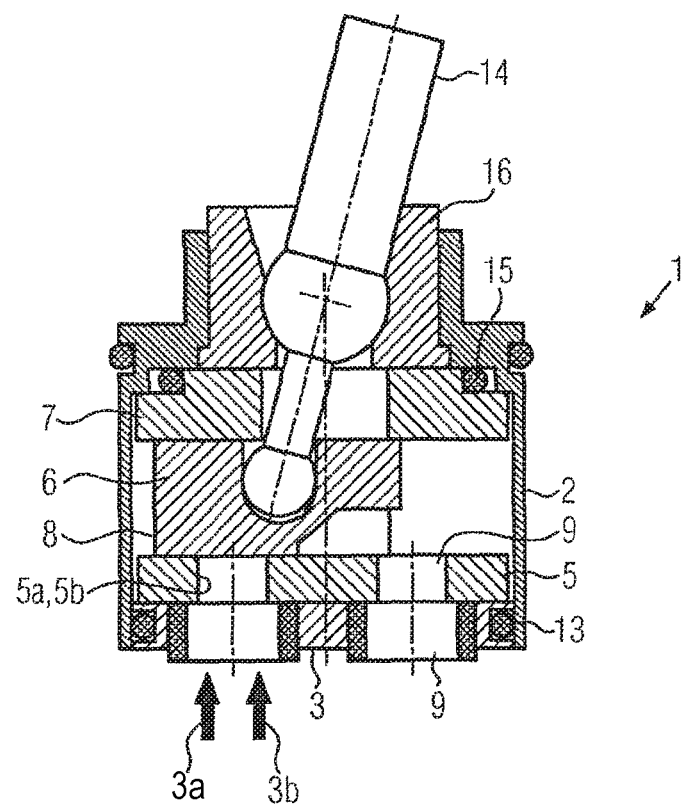

FIG. 1 shows a known control cartridge having a vertical mixed water outlet. FIG. 2 shows a known control cartridge having a lateral mixed water outlet. FIGS. 3 and 4 show a known control cartridge in which the control edges are situated on an inner surface of the control disk having a closed or has a cup-shaped design in the closed and open positions, respectively. FIGS. 5 and 6 show a generic specialized control cartridge having three ceramic disks installed in a housing which has a lateral mixed water outlet. FIG. 7 shows a control cartridge according to the invention which is closed.

Figure 8:
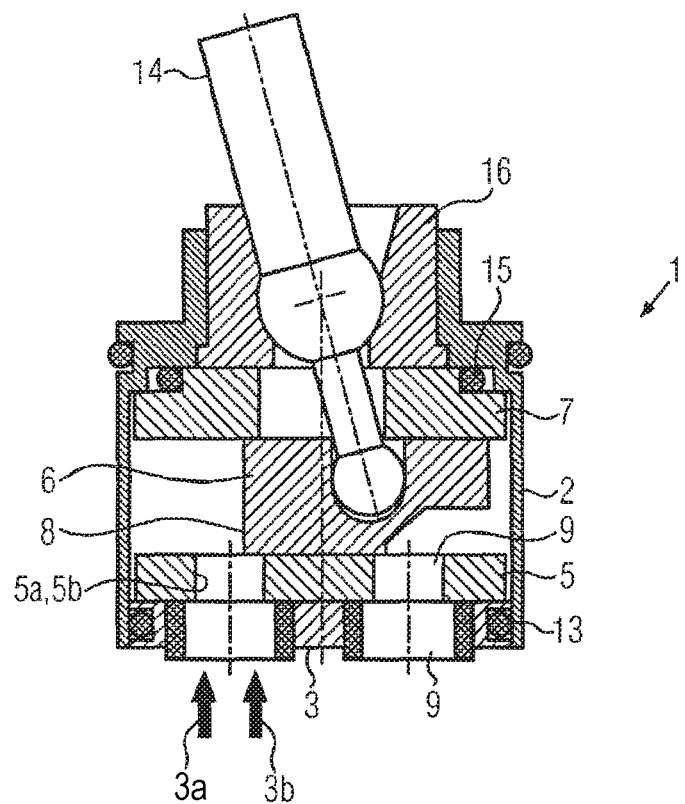
Figure 9:
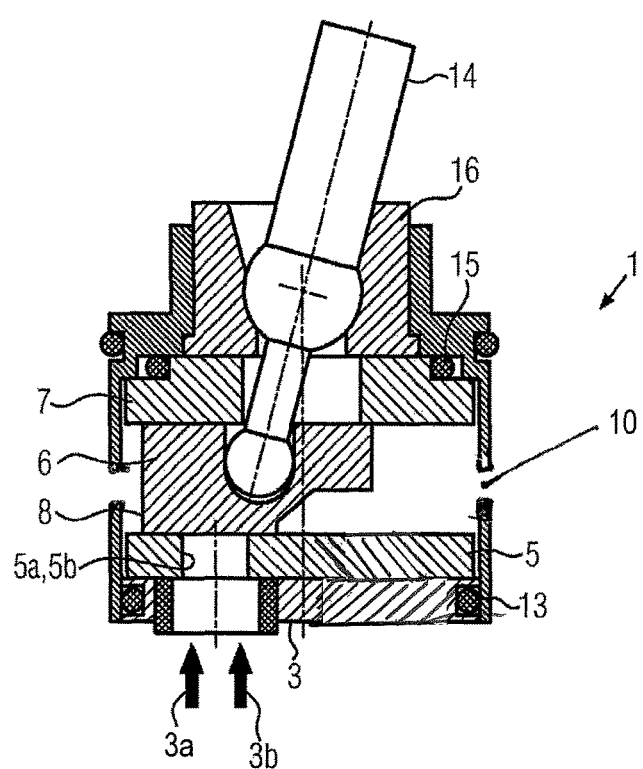

FIG. 8 shows a control cartridge according to the invention which is open. FIG. 9 shows the control cartridge according to the invention having a housing with a lateral mixed water outlet.

As a result of the base and the base disk each having a mixed water outlet in addition to the two inlets, wherein the inlets for hot water and for cold water and the mixed water outlet are situated in the base and in the base disk one above the other, the base is sealed off from the housing wall, and, depending on the requirements, the housing wall has an opening for a lateral mixed water outlet or has no opening in the housing wall for a vertical mixed water outlet, a control cartridge having high volumetric flow is provided in which the mixed water may be discharged either laterally or vertically with the same installation space or the same installation height and installation diameter. The difference lies solely in the housing wall, which for a lateral mixed water outlet has an opening, and which for a vertical mixed water outlet is closed. For a lateral mixed water outlet, the mixed water outlet in the base must be closed.

According to the invention, for a lateral mixed water outlet an opening is situated in the cylindrical housing wall.

According to the invention, for a vertical mixed water outlet the cylindrical housing wall is closed.

The invention is thus characterized in that
a. the base disk in addition to the two inlets has a mixed water outlet (FIGS. 7 and 8 show the control cartridge in the closed and open positions, respectively, with the mixed water outlet in the base disk),
b. the base is sealed off from the housing (FIGS. 7-9), and
c. depending on the requirements, the housing has only a lateral mixed water outlet or only a vertical mixed water outlet, wherein for the housing with the lateral mixed water outlet the housing has only one opening in the circumferential surface of the housing wall (FIG. 9), and for the housing with the vertical mixed water outlet the housing has no mixed water outlet in the housing wall (FIGS. 7 and 8).

According to the invention, the water is no longer diverted in the control disk, but instead is diverted in the housing. As a result, the housing must be sealed off at the bottom and at the top, which at the top is achieved via a third sealing disk (the bearing disk), and at the bottom is achieved via a seal between the base and the housing.

With the same space, it is thus possible to achieve significantly more lift, which is equivalent to greater volumetric flow.

FIG. 7 shows a control cartridge 1 according to the invention which is closed, and FIG. 8 shows a control cartridge 1 according to the invention which is open.

In a housing having a housing wall 2, a base 3 is present in which three boreholes, namely, an inlet 3a for cold water, an inlet 3b for hot water, and a mixed water outlet 9 are situated. According to the invention, the base 3 is sealed off from the housing wall 2. For this purpose, a circumferential sealing ring 13 is situated on the outer periphery of the base 3.

A base disk 5 which, the same as the base 3, has three boreholes, namely, an inlet 5a for cold water, an inlet 5b for hot water, and a mixed water outlet 9, rests on the base 3. The base disk 5 is not sealed off from the housing wall 2 due to the fact that the base 3 is sealed off from the housing wall 2.

A control disk 6 rests on the base disk 5. The special feature of this control disk 6 is the control edge 8 on the circumferential surface. The control disk 6 may be rotated and displaced via the pivot 14.

A bearing disk 7 which is sealed off from the housing or the housing wall 2 via a sealing ring 15 rests on the control disk 6. The pivot 14 protrudes through the bearing disk 7. A bushing 16 in which the pivot 14 is supported is situated on the bearing disk 7.

FIG. 9 shows the control cartridge 1 according to the invention having a housing with a lateral mixed water outlet 10, in which the housing has only one opening 10 in the circumferential surface of the housing wall 2.

The invention claimed is:

1. A control cartridge for single-lever mixing taps, comprising
a housing having a cylindrical housing wall and a base having a borehole for an inlet for cold water, a borehole for an inlet for hot water and a mixed water outlet, the base being sealed off from the housing wall,
a ceramic lower base disk provided on the base, the ceramic lower base disk having a borehole for the inlet for hot water provided above the inlet for hot water, a borehole for the inlet for cold water provided above the inlet for cold water, and a borehole for the mixed water outlet provided above the mixed water outlet,
a rotatable and displaceable ceramic control disk which rests on the base disk and has a bottom surface and a control edge on its outer circumferential surface, the outer circumferential surface of the control disk corresponding to an outer edge of the control disk, the control disk being rotatable and displaceable between a closed position in which the bottom surface of the control disk covers the borehole in the base disk for the inlet for hot water and the borehole in the base disk for the inlet for cold water and an open position in which water from the borehole in the base disk for the inlet for hot water and/or the borehole in the base disk for the inlet for cold water passes between the housing and the outer circumferential surface of the control disk, whereby water from the borehole in the base disk for the inlet for hot water and/or the borehole in the base disk for the inlet for cold water is diverted in the housing to the borehole in the base disk for the mixed water outlet, and
a ceramic upper bearing disk which is sealed off from the housing or the housing wall and rests on the control disk.

2. The control cartridge according to claim 1, wherein the cylindrical housing wall is closed and the mixed water outlet in the base is a vertical mixed water outlet.

3. The control cartridge according to claim 1, further comprising a pivot that protrudes through the bearing disk and is operably connected to the control disk and by which the control disk can be rotated and displaced.

4. The control cartridge according to claim 1, wherein the cylindrical housing wall further comprises a mixed water outlet.

* * * * *